United States Patent [19]

Markhart et al.

[11] 3,887,751

[45] June 3, 1975

[54] ELECTROCONDUCTIVE SHEET MATERIAL AND PROCESS OF PREPARATION

[75] Inventors: Albert H. Markhart, Wilbraham; James O. Santer, East Longmeadow, both of Mass.

[73] Assignee: Monsanto Company, St. Louis, Mo.

[22] Filed: May 12, 1972

[21] Appl. No.: 252,560

[52] U.S. Cl. .... 428/342; 260/89.7 N; 260/91.3 PV; 260/91.7; 96/1.5; 428/514
[51] Int. Cl. ............................................. D21h 1/38
[58] Field of Search .................... 117/155 UA, 201; 260/91.3 PV, 91.7, 89.7 N

[56] References Cited
UNITED STATES PATENTS

| | | | |
|---|---|---|---|
| 2,261,002 | 10/1941 | Ritter | 260/570 |
| 3,335,100 | 8/1967 | Geyer | 117/201 X |
| 3,371,116 | 2/1968 | Nordgren et al. | 260/567.6 |
| 3,619,284 | 11/1971 | Chaudhuri et al. | 117/201 |
| 3,673,164 | 6/1972 | Jones et al. | 117/201 X |

*Primary Examiner*—Michael R. Lusignan
*Attorney, Agent, or Firm*—R. B. Blance; E. P. Grattan; J. C. Logomasini

[57] ABSTRACT

This invention relates to a sheet material with electrically conducting properties for use in electrographic printing wherein a water soluble conductive substance comprising at least one member of a class of polymers formed by the reaction of a 1,4-dihaloalkene-2 compound and an aliphatic di(tertiary amine) is applied to the sheet material to give a weight ratio in the range of 1:1 to 500:1. This sheet material is then treated further with conventional adjuncts such as film forming resins, pigmented resins, photoconductive compositions, etc.

11 Claims, No Drawings

ELECTROCONDUCTIVE SHEET MATERIAL AND PROCESS OF PREPARATION

BACKGROUND OF THE INVENTION

I. Field of the Invention

The present invention relates to a sheet material for use in the electrographic printing wherein the sheet material is prepared by treatment with a water-soluble conductive substance. More particularly, it relates to sheet materials with electroconductive water-soluble quaternary resin comprising at least one member of the group of polymers having recurring units of the general formula:

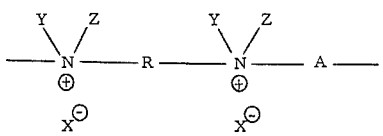

wherein:
1. X is a halogen selected from the group consisting of chlorine and bromine;
2. A is a divalent radical selected from the group consisting of 1,4-butene-2-yl and 1,4-cyclopentene-2-yl radicals optionally substituted with chloro, methyl or ethyl radicals;
3. N is a nitrogen atom;
4. R is a divalent radical selected from the group consisting of phenylene, xylylene and saturated and unsaturated alkylene radicals of two to six carbon atoms optionally substituted with methyl and hydroxyl radicals;
5. Y is a radical selected from the group consisting of $C_1$ to $C_4$ alkyl, $C_1$ to $C_4$ hydroxyalkyl, and when R is an ethylene radical, methylene so that the Y radicals form an ethylene bridge between the nitrogen atoms connected by R;
6. Z is a radical selected from the group consisting of $C_1$ to $C_4$ alkyl, $C_1$ to $C_4$ hydroxyalkyl, and when R is an ethylene radical, methylene so that the Z radicals form an ethylene bridge between the nitrogen atoms connected by R; and
7. The resin degree of polymerization is such that the resin has an intrinsic viscosity of at least 0.05 in 2 percent aqueous sodium chloride at 25°C.

II. The Prior Art

Electrographic printing processes require composite sheet materials comprising an electrically insulating layer on an electrically conductive layer. The electrically conductive layer should possess a surface resistivity of no more than about $1 \times 10^{10}$ to $1 \times 10^8$ ohms over a relative humidity range of about 25 to 80 percent in order to be useful. During the printing process, the sheet material is grounded by placing it on a grounded electrical conductor so that, in effect, the lower surface of the electrically insulating layer is grounded to the conductor on which the sheet material rests, through the electrically conductive layer. The requirement of good electrical conductivity in the conductive layer is a source of major difficulty in securing uniformly satisfactory performance with dielectric and photoconductive reproduction papers under different climatic conditions of humidity and temperature. Much effort has been expended to develop a conductive sheet material which will exhibit a high degree of electroconductivity under varying environmental conditions of temperature, relative humidity, sheet moisture, etc., as well as under the varying operating conditions which are encountered from one copying process and machine to the next.

Various means have been described for increasing the conductivity of sheet material which is used in dielectric and photoconductive printing processes. Such means, while representing valuable contributions to the art, have certain drawbacks which detract from their overall usefulness. These drawbacks include loss of conductivity under conditions of varying humidity, poor aging properties, poor hold-out against solvent based resins used to coat the sheet material, migration of the conductive material in the sheet, difficulty of preparation, undesirable odors, etc.

Polyvinyl alcohol provides a particularly effective treatment for solvent hold-out. Unfortunately, none of the presently available electroconductive resins is compatible with polyvinyl alcohol. Incompatibility is shown inter alia by a pronounced decrease in conductivity when the electroconductive resin is blended with the polyvinyl alcohol and applied to the sheet material.

A definite need exists for a water soluble conductive material for treating sheet material used in dielectric and photoconductive printing processes which will maintain a high electroconductivity under widely varying conditions of temperature and humidity. A further need exists for an electroconductive material which will be compatible with polyvinyl alcohol and other paper-making additives. A further need exists for an easily prepared water soluble electroconductive material which can be used to treat sheet material used in dielectric and photoconductive processes.

SUMMARY OF THE INVENTION

The above-mentioned needs in the prior art are fulfilled by the present invention which provides a new class of electroconductive resin for treatment of sheet material to be used in dielectric and photoconductive printing processes. The class of resins contain recurring units of the general formula:

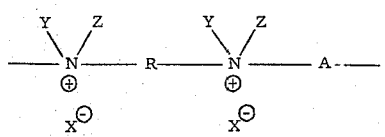

wherein:
1. X is a halogen selected from the group consisting of chlorine and bromine;
2. A is a divalent radical selected from the group consisting of 1,4-butene-2-yl and 1,4-cyclopentene-2-yl radicals optionally substituted with chloro, methyl or ethyl radicals;
3. N is a nitrogen atom;
4. R is a divalent radical selected from the group consisting of phenylene, xylylene and saturated and unsaturated alkylene radicals of two to six carbon atoms optionally substituted with methyl and hydroxyl radicals;
5. Y is a radical selected from the group consisting of $C_1$ to $C_4$ alkyl, $C_1$ to $C_4$ hydroxyalkyl, and when R is an ethylene radical, methylene so that the Y radicals form an ethylene bridge between the nitrogen atoms connected by R;

6. Z is a radical selected from the group consisting of $C_1$ to $C_4$ alkyl, $C_1$ to $C_4$ hydroxyalkyl, and when R is an ethylene radical, methylene so that the Z radicals form an ethylene bridge between the nitrogen atoms connected by R; and 7. The resin degree of polymerization is such that the resin has an intrinsic viscosity of at least 0.05 in 2 percent aqueous sodium chloride at 25°C. The molecular weight of the resins is such that the intrinsic viscosity measured in 2 percent aqueous sodium chloride is at least 0.05. Thus, when R is ethylene and Y and Z are methylene the recurring units have the general formula:

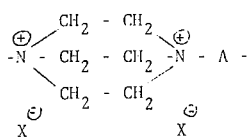

and when R is:

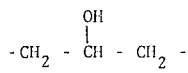

and Y and Z are methyl, the recurring units have the general formula:

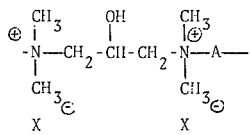

The preparation of the resins is conveniently carried out in aqueous or organic solvent medium by a one-step reaction to yield the conductive resin without the concomitant formation of inorganic acid or inorganic salt. The reactants comprise a 1,4-dihaloalkene-2 compound and a di(tertiary amine). The di(tertiary amine) may be replaced in part with a poly(tertiary amine) to effect molecular weight buildup and chain branching of the resin.

The resins are applied as an aqueous or solvent solution or dispersion by conventional coating methods to the sheet material to give a weight ratio of resin to sheet material in the range of 1:1 to 1:100. The resins can be blended with polyvinyl alcohol and applied to the sheet material to obtain solvent hold out without substantial loss in conductivity.

THE PREFERRED EMBODIMENTS

The electroconductive resins used in the present invention are prepared by reaction of a 1,4-dihaloalkene-2 with a di(tertiary amine) to form a quaternary ammonium polymer.

The 1,4-dihaloalkene-2 can be a linear alkene of four to six carbons optionally with methyl or chloro substituents, or a cyclopentene with methyl or chloro substituents. Examples of such 1,4-dihaloalkenes include 1,4-dichlorobutene-2; 1,4-dibromobutene-2; 1,2,4-trichlorobutene-2; 1,4-dibromo-2-chlorobutene-2; 1,4-dichloro-2-methylbutene-2; 1,4-dibromo-2-methylbutene-2; 1,4-dichloropentene-2; 1,4-dibromopentene-2; 1,4-dibromopentene-2; 1,4-dichlorohexene-2; 1,4-dibromohexene-2; 1,4-dichlorocyclopentene-2 and 1,4-dibromocyclopentene-2. These 1,4-dihaloalkene-2 compounds are conveniently prepared by the thermodynamically controlled addition of halogen to the corresponding alkadiene.

The di(tertiary amines) have the general formula:

$$\begin{array}{c} Y \\ \diagdown \\ N\text{----}R\text{----}N \\ \diagup \\ Z \end{array} \begin{array}{c} Y \\ \diagup \\ \diagdown \\ Z \end{array}$$

wherein N represents nitrogen, R is a phenylene radical, a xylylene radical or a divalent saturated or unsaturated alkylene radical of 2 to 6 carbon atoms optionally substituted with methyl or hydroxyl substituents, Y is an alkyl radical of one to four carbon atoms or a hydroxyalkyl radical of one to four carbon atoms, or a methylene radical when R is an ethylene radical, so that the Y radicals form an ethylene bridge between the nitrogen atoms, and Z is an alkyl radical of one to four carbon atoms, or a hydroxyalkyl radical of one to four carbon atoms, or a methylene radical when R is an ethylene radical, so that the Z radicals form an ethylene bridge between the nitrogen atoms. Examples of such di(tertiary amines) include N,N,N',N'-tetramethyl-ethylenediamine, N,N'-dimethyl piperazine, triethylenediamine, N,N,N',N'-tetramethyl hexylenediamine, N,N,N',N'-tetrabutyl ethylenediamine, N,N,N',N'-tetrakis(hydroxyethyl) ethylene-diamine, 1,3-bis(dimethylamino)-2-hydroxypropane, and N,N,N',N'-tetramethyl p-xylylenediamine.

A convenient method of preparing di(tertiary amines) exists in the reaction of secondary amines with 1,4-dihaloalkene-2-compounds. Secondary amines of general formula $R_1R_2NH$ are used, wherein $R_1$ and $R_2$ are $C_1$ to $C_4$ alkyl and hydroxyalkyl radicals. The preferred secondary amines include dimethylamine, diethylamine, diethanolamine and piperidine. The reaction is exemplified by the following scheme:

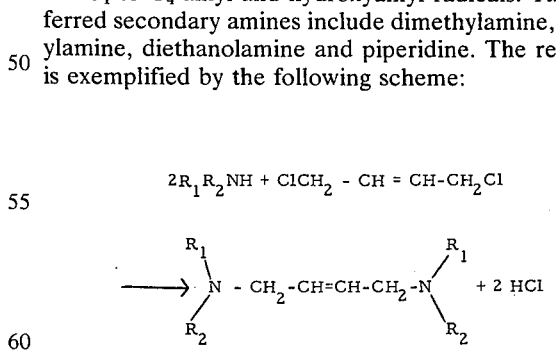

The di(tertiary amine) thus produced is then reacted with excess 1,4-dihaloalkene-2 compound to produce the quaternary ammonium resin.

When the reaction between 1,4-dihaloalkene-2 and di(tertiary amine) is carried out in aqueous medium, it is preferred to use a water soluble di(tertiary amine) such as N,N,N',N'-tetramethyl ethylenediamine, N,N'-dimethylpiperazine, triethylenediamine or 1,3-bis(dimethylamino)-2-hydroxypropane.

In the preparation of the quaternary ammonium polymers of the present invention, a quantity of di(tertiary amine) is dissolved or dispersed in a solvent and the substantially equimolar amount of 1,4-dihaloalkene-2 is added. Alternatively, a dispersion or solution of 1,4-dihaloalkene is prepared and the substantially equimolar amount of di(tertiary amine) is added. The reaction is carried out at a temperature between 25° and 100°C. At the lower temperatures, the reaction tends to be sluggish. At the higher temperatures, excessive color forms in the reaction medium. Consequently, it is preferred to carry out the reaction at a temperature in the range of 35° to 60°C. so that a reasonable rate of reaction is obtained without excessive color formation.

Any liquid which is not appreciably reactive to the dihaloalkene or the di(tertiary amine) may be selected as the reaction medium. A dispersion of quaternary ammonium polymer is formed by the reaction and the dispersion may be applied to a base sheet to render it electroconductive. Alternatively, the quaternary ammonium polymer can be recovered by evaporation of the liquid reaction medium. It can then be dispersed or dissolved in water and applied to the base sheet. The preferred reaction medium is selected from the group consisting of water and the alkanols containing one to three carbon atoms. A particularly preferred mediuum is water since is is non-flammable, non-toxic and allows the electroconductive resin to be applied readily to cellulose sheet materials.

When the reaction is carried out in water, the di(tertiary amine) is dissolved or dispersed in a sufficient quantity of water and the dihaloalkene which is insoluble in water is added at a rate to maintain the reaction medium at the desired temperature. Vigorous agitation aids dispersion and increases the rate of reaction. Stirring is continued after the dihaloalkene has been added, until the reaction is complete as gauged by the disappearance of the second phase. Usually, two to four hours at 35° to 60°C. is sufficient.

Surprisingly, although the 1,4-dihaloalkene-2 compounds are readily hydrolyzed by water to yield alkenediols, the hydrolysis reaction does not interfere appreciably with the reaction between the amine and 1,4-dihaloalkene-2 since there is little impairment in molecular weight of the reaction product from aqueous medium compared with the reaction product from anhydrous alcohol medium. However, it is preferred to add the dihaloalkene to the aqueous solution of di(tertiary amine) rather than to add the di(tertiary amine) to an aqueous dispersion of dihaloalkene so that hydrolysis is minimized.

When reaction is carried out in alcohol solution, a one phase reaction medium is obtained. Stirring is used to disperse the reactants as they are added. The reaction rate, however, is much less dependent on stirring rate. The resin can be applied to a base sheet as an alcohol solution or it can be recovered by evaporation of the solvent. It can then be dissolved in water.

The quantities of reactants and solvent are selected to give a resin content in the final solution in the range of 10 to 90 percent. At low concentrations, the molecular weight of the polymer produced by this step-wise reaction tends to be low particularly when the reaction is carried out in water. At high concentrations, excessive viscosity impedes stirring and mixing. Hence, it is preferred to carry out the reaction initially at high concentration with addition of water during the reaction so that the resin content in the final solution is in the range of 30 to 70 percent.

The di(tertiary amine) may be replaced in part or completely with a poly(tertiary amine) to yield products comprising resins ranging from those with a branched molecular structure to those with a highly crosslinked network structure. Preferred poly(tertiary amines) include N-alkyl polyalkylene polyamines such as N,N,N',N'',N''-pentamethyl diethylenetriamine and N,N,N',N'',N''-pentamethyl dihexylenetriamine, hexamethylene-tetramine, 2,4,6-tris(dimethylaminomethyl) phenol, poly (N-methyl ethylenimine) and poly(N-hydroxyethyl ethylenimine).

In the application of the electroconductive resin to the sheet material, the resin can be incorporated on or with the sheet material by coating, dipping, brushing, calendering or other conventional means. Preferably, an aqueous solution or dispersion of the resin is applied and thereafter the sheet material is dried in the usual way in an oven or on calender rolls. The term sheet material or paper includes cellulosic and synthetic fiber sheet material upon which images may be recorded.

The proportion of electoconductive polymer can be varied in amount from 1 to 500 parts per 500 parts of sheet material depending on the basis weight of the sheet. Where the electroconductive resin is incorporated with the sheet material by coating, a coating weight up to 15 pounds per 3,000 square feet of base sheet is employed. Preferably, the coating weight is between 0.5 and 3.5 pounds per 3,000 square feet since below 0.5 pounds, the conductivity is inadequate and above 3.5 pounds, little further increase in conductivity is observed. The amount of polymer to be incorporated with the sheet material can be varied by selection of a suitable molecular weight and concentration of the polymer in the aqueous solution. The polymer is preferably applied as a continuous surface coating for optimum conductivity. The molecular weight must be adequate for formation of a coherent film. Such coherence is associated with an intrinsic viscosity of at least 0.05 in 2 percent sodium chloride at 25°C.

In a preferred embodiment of the invention, the electroconductive resin is the adduct of 1,4-dichlorobutene-2 and triethylenediamine. Electroconductive sheet materials which incorporate this polymer adduct exhibit an exceptionally stable conductivity over a wide range of humidity. Adducts of 1,4-dichlorobutene-2 and blends of triethylenediamine and other di(tertiary amine) containing as little as 10 weight percent of triethylenediamine also show stability of conductivity over a wide range of humidity.

In another preferred embodiment of the invention, the electroconductive resin is the adduct of 1,4-dichlorobutene-2 and 1,3-bis(trimethylamino)-2-hydroxypropane. In this case, the low cost of the di(tertiary amine) contributes to an economical conductive treatment of the sheet material.

In the preparation of electrographic printing papers such as dielectric papers or photoconductive papers, it is conventional to apply a topcoat of an organic solution or dispersion of an insulating resin to the electroconductive sheet material. The organic solution tends to sink into the electroconductive sheet material especially when the electroconductive resin is present as a light coating so that the dielectric or charge retention properties of the topcoat are impaired. In order to prevent this, it is conventional to formulate the electroconductive resin with a solvent hold-out resin so that the electroconductive sheet material becomes non-absorbent to the subsequently applied organic solution or dispersion, and also non-absorbent to the solvent of liquid toner systems. A preferred solvent hold-out resin is poly(vinyl alcohol). The electroconductive quaternary ammonium polymers used hitherto have been characterized by their incompatibility with poly(vinyl alcohol). The incompatibility is manifested by stringing and gelling when aqueous solutions of poly(vinyl alcohol) and quaternary ammonium polymer are combined, or by phase separation of the combined solutions so that a non-uniform film is deposited when the sheet material is coated with a blend of poly(vinyl alcohol) and quaternary ammonium polymer and the electroconductive properties are substantially impaired. Surprisingly, the quaternary ammonium polymers of the present invention have been found to be exceptionally compatible with poly(vinyl alcohol). Blends of aqueous solutions of the polymers of the present invention and poly(vinyl alcohol) show no stringiness, gelling, or phase separation and the coatings of such blends applied to the sheet material provide adequate conductivity to the sheet for electrographic printing processes. Blends containing up to 1 part of poly(vinyl alcohol) to 1 part of electroconductive resin are used for improved solvent hold out. The poly(vinyl alcohol) is the product of hydrolysis of poly(vinyl acetate) and may contain a residual vinyl acetate content in the range of 1 weight percent to 40 weight percent. The molecular weight of the poly(vinyl alcohol) may range from 2,000 to 500,000.

The following examples are set forth in illustration of this invention and should not be construed as limitations thereof. Unless otherwise indicated, all parts and percentages are given in terms of parts by weight. Add-on is the increase in weight of a ream of paper by addition of resin and adjuncts and is expressed as pounds per 3,000 square feet.

PART A - PREPARATION OF RESINS

Example 1

Reaction Product of 1,3-Bis(dimethylamino)-2-hydroxypropane and 1,4-Dichlorobutene-2

A reaction vessel, equipped with stirrer, reflux condenser, dropping funnel and thermometer is charged with 308 parts, 1,3-bis(dimethylamino)-2-hydroxypropane and 594 parts water. To the stirred solution, 263 parts of 1,3-dichlorobutene-2 is added over a 90 minute period. The batch temperature is allowed to rise from 31°C. to 51°C. during the addition.

Following the addition, the solution is warmed briefly to 76°C., then cooled to 25°C. and diluted with 101 parts of water. The solution is allowed to stand for 16 hours. It is then filtered through a bed of activated charcoal to give a clear, very pale yellow solution containing 45.2 percent of resin. The viscosity is 300 cps at 25°C. When the solution is cast and dried, a continuous film of resin is obtained.

The resin is recovered from the solution by evaporation of the solvent. A yellow resinous mass is obtained.

The intrinsic viscosity measured at 25°C. in a 2 percent aqueous solution of sodium chloride is 0.095.

Examples 2 through 9

The procedure of Example 1 is used to produce a series of electroconductive resins. In each case, the 1,4-dihaloalkene-2 is reacted with the substantially equimolar amount of di(tertiary amine) at a temperature in the range of 30° to 60°C. The term substantially equimolar is used to indicate that slight departures from the exact equimolar proportions of reactants are permissible to compensate for minor amounts of impurities in the reactants, such departures being limited by the requirement that the intrinsic viscosity of the resin produced measured in 2 percent sodium chloride solution at 25°C. be at least 0.05.

TABLE I

PREPARATION OF ELECTROCONDUCTIVE RESINS

| Example | 1,4-Dihaloalkene-2 | Di(tertiary amine) | Solvent | Resin Solution |
|---|---|---|---|---|
| 2 | 1,4-dichlorobutene-2 | triethylenediamine | $H_2O$ | clear, viscous |
| 3 | 1,4-dibromobutene-2 | N,N,N',N'-tetramethyl ethylenediamine | $H_2O$ | clear, viscous |
| 4 | 1,4-dichlorocyclopentene-2 | N,N'-dimethylpiperazine | $H_2O$ | clear, viscous |
| 5 | 1,4-dichloropentene-2 | N,N,N',N'-tetrakis (hydroxyethyl) ethylene diamine | $H_2O$ | clear, viscous |
| 6 | 1,4-dichlorobutene-2 | 1,3-bis(dimethyl-amino) 2-hydroxypropane | MeOH | clear, viscous |
| 7 | 1,4-dichloro-2-methyl-butene-2 | N,N,N',N'-tetramethyl hexylenediamine | MeOH | clear, viscous |
| 8 | 1,4-dichlorohexene-2 | N,N,N',N'-tetrabutyl ethylenediamine | MeOH | clear, viscous |
| 9 | 1,4-dichlorobutene-2 | N,N,N',N'-tetramethyl para-xylylene diamine | PrOH | clear, viscous |

Example 10

This Example is set forth to show the effect of a trifunctional amine on the molecular weight of the resin produced by interaction of 1,4-dichlorobutene-2 and 1,3-bis(dimethylamino)-2-hydroxypropane containing 2,4,6-tris(dimethylaminomethyl)-phenol.

139 Parts of 1,3-bis(dimethylamino)-2-hydroxypropane and 8.3 parts of 2,4,6-tris(dimethylaminomethyl)-phenol are dissolved in 150 parts of water. 64 Parts of 1,4-dichlorobutene-2 are added at a constant rate over a period of 20 minutes. The temperature rises to 60°C. Cooling is applied to the reaction and a further 63 parts of 1,4-dichlorobutene-2 are added at a constant rate over a period of 20 minutes with the temperature held below 45°C. Stirring is continued for 45 minutes. An additional 160 parts of water is added. A clear, yellow solution is obtained. The solids content is 46.3 percent. The viscosity is 2740 cps at 25°C.

Example 11

This Example is set forth to show the preparation of an electroconductive resin by reaction of diethylamine and 1,4-dichlorobutene-2.

292 Parts of diethylamine are dissolved in 200 parts of ethanol and chilled in an ice bath. 125 Parts of 1,4-dichlorobutene-2 in 125 parts of ethanol are added dropwise with stirring. The ice bath is removed. As the solution warms to room temperature, a precipitate of diethylamine hydrochloride forms. Stirring is continued overnight, after which the reaction is filtered and the filtrate is concentrated by evaporation. Vacuum distillation of the crude product gives the desired $Et_2NCH_2CH=CHCH_2NEt_2$ (picrate m. 164–167; lit. m. equals 154°–155°C.).

51 Parts of this amine are dissolved in ethanol and 32 parts of 1,4-dichlorobutene-2 are added with stirring until a clear solution forms. Ethanol is removed and the residue is dissolved in water and filtered.

Example 12

175 Parts of

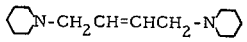

are prepared from piperidine and 1,4-dichlorobutene-2 by the same technique as in Example 11 above, and are dissolved in approximately 400 parts of benzene. 98.5 Parts of 1,4-dichlorobutene-2 are added dropwise. The benzene solution is maintained at 50°C., whereupon a white precipitate forms. After 18 hours at 50°C., the precipitate is filtered, washed with benzene, and dried. 210 Parts of a sticky white powder are obtained. The powder is dissolved in water.

PART B - FORMULATION OF ELECTROCONDUCTIVE RESINS

Example 13

This Example is set forth to demonstrate the formulation of a solvent hold-out composition containing electroconductive resin and poly(vinyl alcohol).

Ten parts of a poly(vinyl alcohol) characterized by a 4 percent aqueous solution viscosity of 5 cps at 20°C. and by a residual vinyl acetate content of 20 percent are dissolved in 48 parts of water. A solution of 22.2 parts of a 45 percent aqueous solution of an electroconductive resin reaction product of 1,4-dichlorobutene-2 and 1,3-bis(dimethylamino)-2-hydroxypropane, of 300 cps viscosity at 25°C. is prepared. The solution of electroconductive resin is added to the poly(vinyl alcohol) solution with stirring. A clear stable solution containing 25 percent solids is obtained. No phase separation occurs during a period of more than one month.

EXAMPLES 14 and 15

Following the procedure of Example 13, aqueous dispersions of electroconductive resin and hold-out resin are prepared.

Example 14 is obtained by blending the electroconductive resin of Example 1 with Gelva Emulsion TS-30, a polyvinyl acetate emulsion produced by Monsanto Company, of average particle size 0.5 micron containing polymer of number average molecular weight in the range of 40,000 to 80,000. The blend ratio is 1:1 at a solids content of 45 percent.

Example 15 is obtained by blending the electroconductive resin of Example 2 with Penford Gum 260, a hydroxyethyl ether derivative of corn starch of intermediate viscosity, produced by Penick and Ford Ltd. Inc. The blend ratio is 1:1 at a solids content of 25 percent.

PART C - EVALUATION OF ELECTROCONDUCTIVE SHEET MATERIAL

Example 16

A series of experiments is carried out to determine the surface resistivity of electroconductive papers.

In each of the series of experiments, a sheet of bleached sulfite base paper of basis weight 35 pounds per ream, sized on one side, is coated on the wire or felt side with a layer of an aqueous solution of electroconductive resin, the concentration of which is adjusted to give a viscosity in the range of 50 to 500 cps and an add-on in the range of 0.5 to 3.0 pounds per 3,000 square feet. Coating is effected with the wire wound rod appropriate to the desired add-on. The coating is dried on a drum drier at 75°C. for a period of 3 minutes. The coated paper is weighed to determine the add-on.

Test pieces are cut from the coated paper. They are conditioned in air for at least 24 hours at 25°C. and the requisite relative humidity. They are tested for surface resitivity by a procedure substantially like that described in Standard Methods of Test for Insulation Resistance of Electrical Insulating Materials, ASTM designation D-257-66. A Keithley Model 6105 Resistivity Adapter coupled with a Cenco High Voltage DC Power supply providing a regulated DC voltage accurate to ± 1 percent is used to determine the resistivity. The excitation voltage is 200 volts. Paper samples are conditioned at the required humidity level for at least 24 hours before surface resistivities are determined. Duplicate determinations are made.

Solvent hold-out is determined by the tentative test procedure developed by Tappi CA1120 on paper conditioned at 50 percent relative humidity and 72°F. for 24 hours. The two test solutions contain 4g. of Cyanamid Calco Oil Blue W dye per liter, respectively, of toluene and Isopar G, a saturated hydrocarbon solvent supplied by Humble Oil Co.

TABLE II

SURFACE RESISTIVITIES OF ELECTROCONDUCTIVE PAPERS

| Resin Example No. | Add-on, pounds per 3,000 square feet | Surface Resistivity, ohms 20% RH | 50% RH |
|---|---|---|---|
| 1 | 0.60 | $1.5 \times 10^9$ | — |
|  | 1.36 | $3.8 \times 10^8$ | — |
| 2 | 1.35 | $1.6 \times 10^8$ | — |
|  | 1.52 | — | $1.2 \times 10^9$ |
|  | 1.97 | $2.1 \times 10^8$ | $2.1 \times 10^8$ |
|  | 2.60 | $2.0 \times 10^8$ | $2.0 \times 10^8$ |
| 10 | 2.22 | $7.4 \times 10^{10}$ | — |
| 11 | 1.27 | $2.2 \times 10^{12}$ | $2.6 \times 10^9$ |
|  | 1.79 | $1.9 \times 10^{12}$ | $2.7 \times 10^9$ |
| 12 | 1.96 | $4.3 \times 10^{12}$ | $7.1 \times 10^9$ |
|  | 2.30 | $2.4 \times 10^{12}$ | $5.1 \times 10^9$ |

TABLE II-Continued

SURFACE RESISTIVITIES OF ELECTROCONDUCTIVE PAPERS

| Resin Example No. | Add-on, pounds per 3,000 square feet | Surface Resistivity, ohms 20% RH | Surface Resistivity, ohms 50% RH |
|---|---|---|---|
| 13 | 1.71 | $2.0 \times 10^{10}$ | $1.5 \times 10^{8}$ |
| 14 | 2.58 | $7.5 \times 10^{8}$ | $1.4 \times 10^{8}$ |
| 15 | 1.52 | $1.2 \times 10^{9}$ | — |

Note the constancy of the surface resistivity over the relative humidity range of 20 to 50 percent of paper coated with the electroconductive resin of Example 2 prepared by reaction of 1,4-dichlorobutene-2 and triethylenediamine. Note also the comparatively low values of surface resistivity of papers coated with blends of electroconductive resin and hold-out resin of Examples 13, 14 and 15.

EXAMPLE 17

A series of experiments is carried out to determine the effectiveness of the electroconductive coatings for hold-out of organic solvent. The resins identified in Table III are applied to Weyerhauser size pressed paper stock with the wire wound rod appropriate to the desired add-on. A series of coatings containing the resins of Examples 1 and 2, and formulated resins of Examples 1 and 2 containing equal amounts by weight of binder resins selected from the group consisting of poly(vinyl alcohol), poly(vinyl acetate, and hydroxyethylated starch, are prepared. Sollvent hold-out data expressed as per cent penetration into the coated papers by the standard Isopar G and toluene solutions of dye are given in Table III.

The poly(vinyl alcohol) of the coatings listed in Table III is Gelvatol 20-30 poly(vinyl alcohol) of Monsanto Company. The poly(vinyl acetate) is Gelva TS-30 poly(vinyl acetate) emulsion of Monsanto Company. The hydroxyethylated starch is Penford Gum 280 of Penick and Ford Ltd.

The data show that the electroconductive resin of Example 1 is excellent in solvent hold-out by itself and when it is formulated with poly(vinyl alcohol). The hold-out is slightly impaired by poly(vinyl acetate) and hydroxyethylated starch. The electroconductive resin of Example 2 is much inferior in solvent hold-out compared with the resin of Example 1. However, when it is formulated with poly(vinyl alcohol), it is equal in performance to the resin of Example 1.

From the above examples, it is apparent that a class of electroconductive resins has been developed for the treatment of sheet materials to impart good electroconductive properties.

The materials of this invention can also be used with those materials commonly used in the paper making industry such as pigments, opacifiers, fillers, extruders, dyes, sizes, etc. In view of the foregoing, it should be obvious that many variations can be made in this invention without departing from its scope.

What we claim is:

1. An electroconductive sheet material comprising a base sheet and an electroconductive quaternary ammonium resin having recurring units of the general formula:

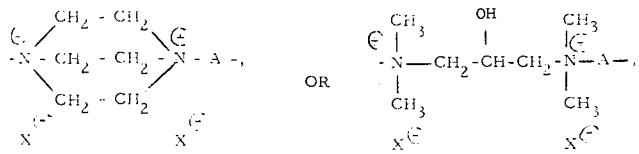

wherein X is bromine or chlorine,
wherein A is a divalent radical selected from the group consisting of

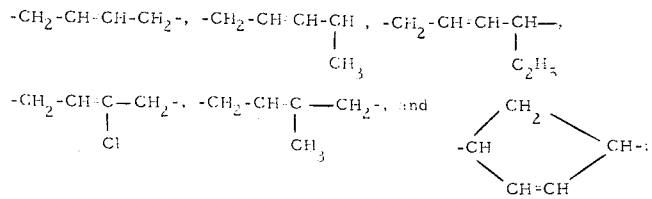

TABLE III

SOLVENT HOLD-OUT OF ELECTROCONDUCTIVE COATINGS

| Coating on Weyerhauser Size Pressed Paper Stock | Add-on, lbs. per 3000 sq. ft. | Penetration, % Isopar G Solution | Penetration, % Toluene Solution |
|---|---|---|---|
| Resin Example 1 | 1.5 | 1 | 12 |
|  | 1.7 | 0 | 7 |
|  | 2.1 | 0 | 2 |
| Resin Example 1, poly-vinyl alcohol, 50:50 | 1.7 | 0 | 0 |
| Resin Example 1, poly-vinyl acetate, 50:50 | 2.3 | 12 | 8 |
|  | 3.0 | 2 | 2 |
| Resin Example 1, hydroxyethylated starch, 50:50 | 2.3 | 2 | 6 |
| Resin Example 2 | 2.5 | 100 | 100 |
| Resin Example 2, poly-vinyl alcohol, 50:50 | 1.8 | 1 | 1 | wherein the quaternary ammonium resin has an intrinsic viscosity of at least 0.05 in 2 percent aqueous sodium cloride at 25°C., wherein the weight ratio of base sheet to electroconductive resin is in the range of 1:1 and 500:1 and the electroconductive resin is present at a coating on at least one surface of the base sheet in an amount ranging from 0.5 to 15 pounds per 3000 sq. ft. of base sheet.

2. The electroconductive sheet material of claim 1 wherein the coating of electroconductive resin comprises up to 50 weight percent of a poly(vinyl alcohol) which contains between 1 and 40 weight percent of residual vinyl acetate and has a molecular weight in the range of 2000 to 500,000.

3. The electroconductive sheet material according to claim 1 wherein the base sheet is a paper of cellulose fiber.

4. The electroconductive sheet material according to claim 1 wherein the weight ratio of base sheet to electroconductive resin is in the range of 1:1 to 500:1.

5. An electroconductive sheet material comprising a base sheet and an electroconductive water soluble quaternary ammonium resin formed by the substantially equimolar reaction of a 1,4-dihaloalkene-2 and a di(tertiary amine) containing from 0 to 10 parts by weight of poly(tertiary amine) per 100 parts of di(tertiary amine), wherein the 1,4-dihaloalkene-2 is selected from the group consisting of the 1,4-dibromo and 1,4-dichloro substitution products of butene-2, pentene-2, hexene-2, 2-methyl-butene-2, 2-chlorobutene-2 and cyclopentene-2, and wherein the di(tertiary amine) is selected from the group consisting of triethylenediamine and 1,3-bis(dimethylamino)-2-hydroxypropane.

6. The electroconductive sheet material according to claim 5 wherein the 1,4-dihaloalkene-2 is 1,4-dichlorobutene-2 and the di(tertiary amine) is triethylenediamine.

7. The electroconductive sheet material according to claim 5 wherein the 1,4-dihaloalkene-2 is 1,4-dichlorobutene-2 and the di(tertiary amine) is 1,3-bis(dimethylamino)-2-hydroxypropane.

8. The electroconductive sheet material according to claim 5 wherein the poly(tertiary amine) is selected from the group consisting of N,N,N',N'',N''-pentamethyl diethylenetriamine, N,N,N',N'',N''-pentamethyl dihexylenetriamine, hexamethylenetetramine, 2,4,6-tris(dimethylaminomethyl)phenol, poly(N-methyl ethylenimine) and poly(N-hydroxyethyl ethylenimine).

9. The electroconductive sheet material according to claim 5 wherein the weight ratio of base sheet to electroconductive resin is in the range of 1:1 to 500:1.

10. The electroconductive sheet material according to claim 5 wherein the electroconductive resin is present as a coating on at least one surface of the base sheet in an amount ranging from 0.5 to 15.0 pounds per 3000 square feet of base sheet.

11. The electroconductive sheet material according to claim 10 further characterized in that the coating of electroconductive resin comprises up to 50 weight percent of a poly(vinyl alcohol) which contains between 1 and 40 weight percent of residual vinyl acetate and has a molecular weight in the range of 2000 to 500,000.

* * * * *